US009015354B2

(12) United States Patent
Pitsianis et al.

(10) Patent No.: US 9,015,354 B2
(45) Date of Patent: Apr. 21, 2015

(54) EFFICIENT COMPLEX MULTIPLICATION AND FAST FOURIER TRANSFORM (FFT) IMPLEMENTATION ON THE MANARRAY ARCHITECTURE

(71) Applicant: Altera Corporation, San Jose, CA (US)

(72) Inventors: Nikos P. Pitsianis, Durham, NC (US); Gerald George Pechanek, Cary, NC (US); Ricardo Rodriguez, Raleigh, NC (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/456,011

(22) Filed: Aug. 11, 2014

(65) Prior Publication Data

US 2015/0039856 A1  Feb. 5, 2015

Related U.S. Application Data

(60) Division of application No. 13/116,332, filed on May 26, 2011, now Pat. No. 8,904,152, which is a continuation of application No. 12/187,746, filed on Aug. 7, 2008, now Pat. No. 7,962,719, which is a division of application No. 10/859,708, filed on Jun. 3, 2004, now Pat. No. 7,424,594, which is a division of application No. 09/337,839, filed on Jun. 22, 1999, now Pat. No. 6,839,728.

(60) Provisional application No. 60/103,172, filed on Oct. 6, 1998.

(51) Int. Cl.
*G06F 9/44* (2006.01)
*G06F 15/82* (2006.01)
*G06F 15/80* (2006.01)
*G06F 9/30* (2006.01)
*G06F 17/14* (2006.01)

(52) U.S. Cl.
CPC ............ *G06F 15/82* (2013.01); *G06F 15/8038* (2013.01); *G06F 15/8023* (2013.01); *G06F 9/30032* (2013.01); *G06F 17/142* (2013.01)

(58) Field of Classification Search
CPC   G06F 17/142; G06F 15/8023; G06F 9/30032
USPC .......................................... 712/245; 708/622
See application file for complete search history.

(56) References Cited

U.S. PATENT DOCUMENTS 6,434,583 B1 *   8/2002   Dapper et al. ................ 708/409

* cited by examiner

*Primary Examiner* — Ernest Unelus
(74) *Attorney, Agent, or Firm* — Law Offices of Peter H. Priest, PLLC

(57) ABSTRACT

Efficient computation of complex multiplication results and very efficient fast Fourier transforms (FFTs) are provided. A parallel array VLIW digital signal processor is employed along with specialized complex multiplication instructions and communication operations between the processing elements which are overlapped with computation to provide very high performance operation. Successive iterations of a loop of tightly packed VLIWs are used allowing the complex multiplication pipeline hardware to be efficiently used. In addition, efficient techniques for supporting combined multiply accumulate operations are described.

20 Claims, 23 Drawing Sheets

MPYCX-MULTIPLY COMPLEX
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | Rt | | | | | Rx | | | | | Ry | | | | | CE3 | | | | 0 | RM | |

Syntax/Operation

| INSTRUCTION | OPERANDS | OPERATION | ACF |
|---|---|---|---|
| | | Dual Halfwords | |
| MPYCX.[SP]M.2SH | Rt, Rx, Ry RoundMode | Do operation below but do not affect ACFs | None |
| MPYCX.[CNVZ].[SP]M.2SH | Rt, Rx, Ry RoundMode | Rt.H1 ← round ((Rx.H1 * Ry.H1 − Rx.H0 * Ry.H0)/2$^{15}$) Rt.H0 ← round ((Rx.H1 * Ry.H0 + Rx.H0 * Ry.H1)/2$^{15}$) | F1 F0 |
| [TF].MPYCX.[SP]M.2SH | Rt, Rx, Ry RoundMode | Do operation only if T/F condition is satisfied in ACFs | None |

210

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION PRIOR TO THE DIVIDE, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 2B

MPYCXD2-MULTIPLY COMPLEX DIVIDE BY 2
ENCODING

300

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | | UNIT | | | MAUopcode | | | | | Rt | | | | | Rx | | | | | Ry | | | | | CE3 | | | 0 | RM |

FIG. 3A

Syntax/Operation

310

| INSTRUCTION | OPERANDS | OPERATION | ACF |
|---|---|---|---|
| | | | Dual Halfwords |
| MPYCXD2.[SP]M.2SH | Rt, Rx, Ry RoundMode | Do operation below but do not affect ACFs | None |
| MPYCXD2[CNVZ].[SP]M.2SH | Rt, Rx, Ry RoundMode | Rt.H1 ← round ((Rx.H1 * Ry.H1 - Rx.H0 * Rx.H0)/$2^{16}$) | F1 |
| | | Rt.H0 ← round ((Rx.H1 * Ry.H0 + Rx.H0 * Ry.H1)/$2^{16}$) | F0 |
| [TF].MPYCXD2.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION) | THE OPERAND RoundMode IS ONE OF THE FOLLOWING:
N=MSB OF RESULT
Z=1 IF ZERO RESULT IS GENERATED, 0 OTHERWISE
V=1 IF AN INTEGER OVERFLOW OCCURS ON EITHER OPERATION PRIOR TO THE DIVIDE, 0 OTHERWISE
C=NOT AFFECTED R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 3B

MPYCXJ-MULTIPLY COMPLEX CONJUGATE
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | | | MAUopcode | | | | | | Rt | | | | | Rx | | | | | Ry | | | | | CE3 | | 0 | | RM | |

Syntax/Operation

| INSTRUCTION | OPERANDS | OPERATION | ACF |
|---|---|---|---|
| | | Dual Halfwords | |
| MPYCXJ.[SP]M.2SH | Rt, Rx, Ry RoundMode | Do operation below but do not affect ACFs | None |
| MPYCXJ[CNVZ].[SP]M.2SH | Rt, Rx, Ry RoundMode | Rt.H1 ← round ((Rx.H1 * Ry.H1 + Rx.H0 * Ry.H0)/2$^{15}$) | F1 |
| | | Rt.H0 ← round ((Rx.H0 * Ry.H1 − Rx.H1 * Ry.H0)/2$^{15}$) | F0 |
| [TF].MPYCXJ.[SP]M.2SH | Rt, Rx, Ry RoundMode | Do operation only if T/F condition is satisfied in ACFs | None |

410

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 4B

MPYCXJD2-MULTIPLY COMPLEX CONJUGATE DIVIDE BY 2
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | | | | MAUopcode | | | | | | Rt | | | | | Rx | | | | | Ry | | | | | CE3 | | | 0 | RM |

Syntax/Operation

| INSTRUCTION | OPERANDS | OPERATION | ACF |
|---|---|---|---|
| | | Dual Halfwords | |
| MPYCXJD2.[SP]M.2SH | Rt, Rx, Ry RoundMode | Do operation below but do not affect ACFs | None |
| MPYCXJD2[CNVZ].[SP]M.2SH | Rt, Rx, Ry RoundMode | Rt.H1 ← round ((Rx.H1 * Ry.H1 + Rx.H0 * Ry.H0)/2$^{16}$) Rt.H0 ← round ((Rx.H0 * Ry.H1 - Rx.H1 * Ry.H0)/2$^{16}$) | F1 F0 |
| [TF].MPYCXJD2.[SP]M.2SH | Rt, Rx, Ry RoundMode | Do operation only if T/F condition is satisfied in ACFs | None |

510

ARITHMETIC SCALAR FLAGS AFFECTED (ON LEAST SIGNIFICANT OPERATION) | THE OPERAND RoundMode IS ONE OF THE FOLLOWING:
N=MSB OF RESULT
Z=1 IF ZERO RESULT IS GENERATED, 0 OTHERWISE
V=1 IF AN INTEGER OVERFLOW OCCURS ON EITHER OPERATION, 0 OTHERWISE
C=NOT AFFECTED R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 5B

INPUT OF THE DATA X AND ITS
CORRESPONDING TWIDDLE FACTOR W:

| LOAD | ALU | MAU | DSU | STORE |
|---|---|---|---|---|
| lii.p.w | | | | |
| lii.p.w | | | | |

THE COMPLEX ARGUMENTS X AND W ARE MULTIPLIED:

| LOAD | ALU | MAU | DSU | STORE |
|---|---|---|---|---|
| lii.p.w | | | | |
| lii.p.w | | mpycx.pm.2sh | | |

A COMMUNICATIONS OPERATIONS BETWEEN PEs:

| LOAD | ALU | MAU | DSU | STORE |
|------|-----|-----|-----|-------|
| lii.p.w |  |  |  |  |
| lii.p.w |  |  |  |  |
|  |  | mpycx.pm.2sh |  |  |
|  |  |  | pexchg.pd.w |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

FIG. 9C ← 930

THE LOCAL AND RECEIVED QUANTITIES ARE ADDED OR SUBTRACTED (DEPENDING UPON THE PROCESSING ELEMENT.

| LOAD | ALU | MAU | DSU | STORE |
|------|-----|-----|-----|-------|
| lii.p.w |  |  |  |  |
| lii.p.w |  |  |  |  |
|  |  | mpycx.pm.2sh |  |  |
|  | sub.pa.2h |  | pexchg.pd.w |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

FIG. 9D ← 940

ANOTHER SET OF PE-TO-PE COMMUNICATIONS WHERE
THE PREVIOUS PRODUCT IS EXCHANGED BETWEEN
THE PES:

| LOAD | ALU | MAU | DSU | STORE |
|---|---|---|---|---|
| lii.p.w | | | | |
| lii.p.w | | | | |
| | | mpycx.pm.2sh | | |
| | sub.pa.2h | | | |
| | | | pexchg.pd.w | |
| | | mpycx.pm.2h | | |
| | | | pexchg.pd.w | |
| | | | | |
| | | | | |
| | | | | |

THE RESULT IS MULTIPLIED BY -i ON PE3:

| LOAD | ALU | MAU | DSU | STORE |
|---|---|---|---|---|
| lii.p.w | | | | |
| lii.p.w | | | | |
| | | mpycx.pm.2sh | | |
| | sub.pa.2h | | | |
| | | | pexchg.pd.w | |
| | | mpycx.pm.2h | | |
| | | | | |
| | | | | |
| | | | | |
| | | | | |

THE LOCAL AND RECEIVED QUANTITIES ARE ADDED OR SUBTRACTED (DEPENDING ON THE PROCESSING ELEMENT);

| LOAD | ALU | MAU | DSU | STORE |
|---|---|---|---|---|
| lii.p.w | | | | |
| lii.p.w | | | | |
| | | mpycx.pm.2sh | | |
| | sub.pa.2h | | | |
| | | | pexchg.pd.w | |
| | | mpycx.pm.2sh | | |
| | sub.pa.2h | | | |
| | | | pexchg.pd.w | |
| | | | | |

THE RESULTS ARE STORED TO LOCAL MEMORY:

| LOAD | ALU | MAU | DSU | STORE |
|---|---|---|---|---|
| lii.p.w | | | | |
| lii.p.w | | | | |
| | | mpycx.pm.2sh | | |
| | sub.pa.2h | | | |
| | | | pexchg.pd.w | |
| | | mpycx.pm.2sh | | |
| | sub.pa.2h | | | |
| | | | pexchg.pd.w | |
| | | | | sii.p.w |

| VLIW | LOAD | ALU | MAU | DSU | STORE |
|---|---|---|---|---|---|
| | lii.p.w R0,a0=,1 | | | | |
| | lii.p.w R1,a1=,1 | | | | |
| | lii.p.w R0,a0=,1 | | mpycx.pm.2sh r2,r0,r1 | | |
| | lii.p.w R1,a1=,1 | | | | |
| | lii.p.w R0,a0=,1 | | mpycx.pm.2sh r2,r0,r1 | pexchg.pd.w r3,r2,2x2_north | |
| | lii.p.w R1,a1=,1 | sub.pa.2h r4,r2,r3 | | | |
| | lii.p.w R0,a0=,1 | | mpycx.pm.2sh r2,r0,r1 | pexchg.pd.w r3,r2,2x2_north | |
| | lii.p.w R1,a1=,1 | sub.pa.2h r4,r2,r3 | mpycx.pm.2sh r5,r4,r8 | | |
| | lii.p.w R0,a0=,1 | sub.pa.2h r4,r2,r3 | mpycx.pm.2sh r2,r0,r1 | pexchg.pd.w r3,r2,2x2_north | |
| 1 | lii.p.w R1,a1=,1 | sub.pa.2h r7,r5,r6 | mpycx.pm.2sh r5,r4,r8 | pexchg.pd.w r6,r5,2x2_east | |
| 2 | lii.p.w R0,a0=,1 | sub.pa.2h r4,r2,r3 | mpycx.pm.2sh r2,r0,r1 | pexchg.pd.w r3,r2,2x2_north | |
| 1 | lii.p.w R1,a1=,1 | sub.pa.2h r7,r5,r6 | mpycx.pm.2sh r5,r4,r8 | pexchg.pd.w r6,r5,2x2_east | sii.p.w r7,a2+,1 |
| 2 | lii.p.w R0,a0=,1 | sub.pa.2h r4,r2,r3 | mpycx.pm.2sh r2,r0,r1 | pexchg.pd.w r3,r2,2x2_north | |
| 2 | lii.p.w R1,a1=,1 | sub.pa.2h r4,r2,r3 | mpycx.pm.2sh r5,r4,r8 | pexchg.pd.w r6,r5,2x2_east | sii.p.w r7,a2+,1 |

| | LOAD | ALU | MAU | DSU | STORE |
|---|---|---|---|---|---|
| 1 | | | | pexchg.pd.w r4,r2 | |
| 2 | lii.p.d r2,a0+,1 | add.pa.4h r6,r4,r12 | | pexchg.pd.w r5,r3 | sii.p.d r6,a1+,1 |
| 3 | | add.pa.4h r6,r4,r2 | | pexchg.pd.w r4,r12 | |
| 4 | lii.p.d r2,a0+,1 | | | pexchg.pd.w r5,r13 | sii.p.d r6,a1+,1 |

PE1

| | LOAD | ALU | MAU | DSU | STORE |
|---|---|---|---|---|---|
| 1 | lii.p.d r8,a2+,1 | sub.pa.4h r6,r4,r12 | mpycx.pm.2sh r12,r0,r18 | pexchg.pd.w r4,r2 | |
| 2 | lii.p.d r0,a0+,1 | | mpycx.pm.2sh r13,r1,r19 | pexchg.pd.w r5,r3 | sii.p.d r6,a1+,1 |
| 3 | lii.p.d r18,a2+,1 | sub.pa.4h r6,r4,r2 | mpycx.pm.2sh r2,r0,r8 | pexchg.pd.w r4,r12 | |
| 4 | lii.p.d r0,a0+,1 | | mpycx.pm.2sh r3,r1,r9 | pexchg.pd.w r5,r13 | sii.p.d r6,a1+,1 |

FIG. 9J $y = (I_m \otimes A) x$

Example: $y = (I_4 \otimes A) x_8$ $$\left( \begin{bmatrix} 1 & 0 & 0 & 0 \\ 0 & 1 & 0 & 0 \\ 0 & 0 & 1 & 0 \\ 0 & 0 & 0 & 1 \end{bmatrix} \otimes \begin{bmatrix} a & b \\ c & d \end{bmatrix} \right) \begin{bmatrix} x_0 \\ x_1 \\ x_2 \\ x_3 \\ x_4 \\ x_5 \\ x_6 \\ x_7 \end{bmatrix} = \begin{bmatrix} a & b & 0 & 0 & 0 & 0 & 0 & 0 \\ c & d & 0 & 0 & 0 & 0 & 0 & 0 \\ 0 & 0 & a & b & 0 & 0 & 0 & 0 \\ 0 & 0 & c & d & 0 & 0 & 0 & 0 \\ 0 & 0 & 0 & 0 & a & b & 0 & 0 \\ 0 & 0 & 0 & 0 & c & d & 0 & 0 \\ 0 & 0 & 0 & 0 & 0 & 0 & a & b \\ 0 & 0 & 0 & 0 & 0 & 0 & c & d \end{bmatrix} \begin{bmatrix} x_0 \\ x_1 \\ x_2 \\ x_3 \\ x_4 \\ x_5 \\ x_6 \\ x_7 \end{bmatrix} = \begin{bmatrix} ax_0 + bx_1 \\ cx_0 + dx_1 \\ ax_2 + bx_3 \\ cx_2 + dx_3 \\ ax_4 + bx_5 \\ cx_4 + dx_5 \\ ax_6 + bx_7 \\ cx_6 + dx_7 \end{bmatrix}$$

$y = (A \otimes I_m) x$

Example: $y = (A \otimes I_4) x_8$ $$\left( \begin{bmatrix} a & b \\ c & d \end{bmatrix} \otimes \begin{bmatrix} 1 & 0 & 0 & 0 \\ 0 & 1 & 0 & 0 \\ 0 & 0 & 1 & 0 \\ 0 & 0 & 0 & 1 \end{bmatrix} \right) \begin{bmatrix} x_0 \\ x_1 \\ x_2 \\ x_3 \\ x_4 \\ x_5 \\ x_6 \\ x_7 \end{bmatrix} = \begin{bmatrix} a & 0 & 0 & 0 & b & 0 & 0 & 0 \\ 0 & a & 0 & 0 & 0 & b & 0 & 0 \\ 0 & 0 & a & 0 & 0 & 0 & b & 0 \\ 0 & 0 & 0 & a & 0 & 0 & 0 & b \\ c & 0 & 0 & 0 & d & 0 & 0 & 0 \\ 0 & c & 0 & 0 & 0 & d & 0 & 0 \\ 0 & 0 & c & 0 & 0 & 0 & d & 0 \\ 0 & 0 & 0 & c & 0 & 0 & 0 & d \end{bmatrix} \begin{bmatrix} x_0 \\ x_1 \\ x_2 \\ x_3 \\ x_4 \\ x_5 \\ x_6 \\ x_7 \end{bmatrix} = \begin{bmatrix} ax_0 + bx_4 \\ ax_1 + bx_5 \\ ax_2 + bx_6 \\ ax_3 + bx_7 \\ cx_0 + dx_4 \\ cx_1 + dx_5 \\ cx_2 + dx_6 \\ cx_3 + dx_7 \end{bmatrix}$$

MPYA-MULTIPLY ACCUMULATE
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | | | RTE | | | | 0 | | | Rx | | | | | Ry | | | | 0 | CE2 | MPack | |

FIG. 11A

Syntax/Operation

| INSTRUCTION | OPERANDS | OPERATION | ACF |
|---|---|---|---|
| MPYA.[SP]M.1[SU]W | Rte, Rx, Ry | Do operation below but do not affect ACFs | Word |
| MPYA[CNVZ].[SP]M.1[SU]W | Rte, Rx, Ry | Rto‖Rte ← (Rx * Ry) + Rto‖Rte | None |
| [TF].MPYA.[SP]M.1[SU]W | Rte, Rx, Ry | Do operation only if T/F condition is satisfied in ACFs | F0 |
| | | | None |
| | | | Dual Halfwords |
| MPYA.[SP]M.2[SU]H | Rte, Rx, Ry | Do operation below but do not affect ACFs | None |
| MPYA[CNVZ].[SP]M.1[SU]H | Rte, Rx, Ry | Rto ← (Rx.H1 * Ry.H1) + Rto<br>Rte ← (Rx.H0 * Ry.H0) + Rte | F1 |
| | | | F0 |
| [TF].MPYA.[SP]M.2[SU]H | Rte, Rx, Ry | Do operation only if T/F condition is satisfied in ACFs | None |

ARITHMETIC FLAGS AFFECTED
N=MSB OF RESULT
Z=1 IF RESULT IS ZERO, 0 OTHERWISE
V=1 IF AN OVERFLOW OCCURS ON THE ADDITION, 0 OTHERWISE
C=1 IF AN CARRY OCCURS ON THE ADDITION, 0 OTHERWISE

CYCLES: 2

FIG. 11B

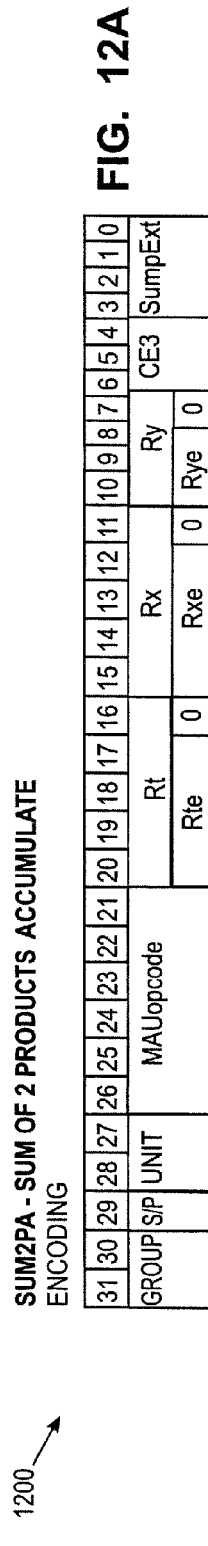

SUM2PA - SUM OF 2 PRODUCTS ACCUMULATE
ENCODING

| 31 30 | 29 | 28 27 | 26 25 24 23 22 21 | 20 19 18 | 17 | 16 15 14 13 12 11 | 10 9 8 | 7 6 5 | 4 3 2 1 0 |
|---|---|---|---|---|---|---|---|---|---|
| GROUP | S/P | UNIT | MAUopcode | Rt | 0 | Rx | Ry | CE3 | SumpExt |
| | | | | Rte | | Rxe | Rye 0 | | |

Syntax/Operation

| INSTRUCTION | OPERANDS | OPERATION | ACF |
|---|---|---|---|
| | | Dual Halfwords | |
| SUM2PA.[SP]M.2[SU]H | Rt, Rx, Ry | Do operation below but do not affect ACFs | None |
| SUM2PA[CNVZ].[SP]M.2[SU]H | Rt, Rx, Ry | Rt ← Rt + (Rx.H1 * Ry.H1) + (Rx.H0 * Ry.H0) | F0 |
| [TF].SUM2PA.[SP]M.2[SU]H | Rt, Rx, Ry | Do operation only if T/F condition is satisfied in ACFs | None |
| | | Quad Halfwords | |
| SUM2PA.[SP]M.4[SU]H | Rte, Rxe, Rye | Do operation below but do not affect ACFs | None |
| SUM2PA[CNVZ].[SP]M.4[SU]H | Rte, Rxe, Rye | Rto ← Rto+ (Rxo.H1 * Ryo.H1) + (Rxo.H0 * Ryo.H0)<br>Rte ← Rte+ (Rxe.H1 * Rye.H1) + (Rxe.H0 * Rye.H0) | F1<br>F0 |
| [TF].SUM2PA.[SP]M.4[SU]H | Rte, Rxe, Rye | Do operation only if T/F condition is satisfied in ACFs | None |

1210

ARITHMETIC SCALAR FLAGS AFFECTED (on least significant operation)
N=MSB OF RESULT
Z=1 IF RESULT IS ZERO, 0 OTHERWISE
V=1 IF AN OVERFLOW OCCURS ON THE ADD WITH Rt, 0 OTHERWISE
C=1 IF AN CARRY OCCURS ON THE ADD WITH Rt, 0 OTHERWISE

CYCLES: 2

FIG. 12B

MPYCXA-MULTIPLY COMPLEX ACCUMULATE
ENCODING

1300

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | | | | MAUopcode | | | | | Rt | | | | | Rx | | | | | Ry | | | | | CE3 | | 0 | RM | | |

FIG. 13A

Syntax/Operation

1310

| INSTRUCTION | OPERANDS | OPERATION | ACF |
|---|---|---|---|
| | | Dual Halfwords | |
| MPYCXA.[SP]M.2SH | Rt, Rx, Ry RoundMode | Do operation below but do not affect ACFs | None |
| MPYCXA[CNVZ].[SP]M.2SH | Rt, Rx, Ry RoundMode | Rt.H1 ← round ((Rt.H1+ Rx.H1 * Ry.H1 - Rx.H0 * Ry.H0)/2$^{15}$) | F1 |
| | | Rt.H0 ← round ((Rt.H0+ Rx.H1 * Ry.H0 + Rx.H0 * Ry.H1)/2$^{15}$) | F0 |
| [TF].MPYCXA.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION PRIOR TO THE DIVIDE, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

MPYCXAD2-MULTIPLY COMPLEX ACCUMULATE DIVIDE BY 2
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | | | MAUopcode | | | | | | Rt | | | | | Rx | | | | | Ry | | | | | CE3 | | | 0 | RM | |

Syntax/Operation

| INSTRUCTION | OPERANDS | OPERATION | ACF |
|---|---|---|---|
| | | Dual Halfwords | |
| MPYCXAD2.[SP]M.2SH | Rt, Rx, Ry RoundMode | Do operation below but do not affect ACFs | None |
| MPYCXAD2[CNVZ].[SP]M.2SH | Rt, Rx, Ry RoundMode | Rt.H1 ← round ((Rt.H1+ Rx.H1 * Ry.H1 - Rx.H0 * Ry.H0)/2$^{16}$) | F1 |
| | | Rt.H0 ← round ((Rt.H0+ Rx.H1 * Ry.H0 + Rx.H0 * Ry.H1)/2$^{16}$) | F0 |
| [TF].MPYCXAD2.[SP]M.2SH | Rt, Rx, Ry RoundMode | Do operation only if T/F condition is satisfied in ACFs | None |

| ARITHMETIC SCALAR FLAGS AFFECTED (ON LEAST SIGNIFICANT OPERATION) | THE OPERAND RoundMode IS ONE OF THE FOLLOWING: |
|---|---|
| N=MSB OF RESULT<br>Z=1 IF ZERO RESULT IS GENERATED, 0 OTHERWISE<br>V=1 IF AN INTEGER OVERFLOW OCCURS ON EITHER OPERATION PRIOR TO THE DIVIDE, 0 OTHERWISE<br>C=NOT AFFECTED | R=TRUNC FOR ROUNDING TOWARDS ZERO<br>R=CEIL FOR ROUNDING TOWARDS POSITIVE INFINITY<br>R=FLOOR FOR ROUNDING TOWARDS NEGATIVE INFINITY<br>R=ROUND FOR ROUNDING TO THE NEAREST INTEGER |

CYCLES: 2

MPYCXJ-MULTIPLY COMPLEX CONJUGATE ACCUMULATE
ENCODING

| 31 30 29 | 28 27 26 25 24 23 | 22 21 20 19 18 | 17 16 15 14 13 12 11 | 10 9 8 7 6 5 | 4 3 2 | 1 0 |
|---|---|---|---|---|---|---|
| GROUP S/P | UNIT | MAUopcode | Rt | Rx | Ry | CE3 0 | RM |

Syntax/Operation

| INSTRUCTION | OPERANDS | OPERATION | ACF |
|---|---|---|---|
| | | | Dual Halfwords |
| MPYCXJA.[SP]M.2SH | Rt, Rx, Ry RoundMode | Do operation below but do not affect ACFs | None |
| MPYCXJA[CNVZ].[SP]M.2SH | Rt, Rx, Ry RoundMode | Rt.H1 ← round ((Rt.H1+ Rx.H1 * Ry.H1 + Rx.H0 * Ry.H0)/2$^{15}$) | F1 |
| | | Rt.H0 ← round ((Rt.H0+ Rx.H0 * Ry.H1 - Rx.H1 * Ry.H0)/2$^{15}$) | F0 |
| [TF].MPYCXJA.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 15B

MPYCXJD2-MULTIPLY COMPLEX CONJUGATE ACCUMULATE DIVIDE BY 2
ENCODING

1600 →

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | | Rt | | | | | Rx | | | | | Ry | | | | | CE3 | | | 0 | RM | |

FIG. 16A

Syntax/Operation

1610 →

| INSTRUCTION | OPERANDS | OPERATION | ACF |
|---|---|---|---|
| | | Dual Halfwords | |
| MPYCXJAD2.[SP|M.2SH | Rt, Rx, Ry RoundMode | Do operation below but do not affect ACFs | None |
| MPYCXJAD2[CNVZ].[SP|M.2SH | Rt, Rx, Ry RoundMode | RtH1 ← round ((RtH1+ Rx.H1 * Ry.H1 + Rx.H0 * Ry.H0)/2$^{16}$)  RtH0 ← round ((Rt.H0+ Rx.H0 * Ry.H1 - Rx.H1 * Ry.H0/2$^{16}$) | F1  F0 |
| [TF].MPYCXJAD2.[SP|M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION, 0 OTHERWISE
C=NOT AFFECTED

THE OPERAND RoundMode IS ONE OF THE FOLLOWING:

R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 16B

EFFICIENT COMPLEX MULTIPLICATION AND FAST FOURIER TRANSFORM (FFT) IMPLEMENTATION ON THE MANARRAY ARCHITECTURE

This application is a divisional of and claims the benefit of and priority to U.S. application Ser. No. 13/116,332 filed May 26, 2011 which is a continuation of U.S. application Ser. No. 12/187,746 filed Aug. 7, 2008 issued as U.S. Pat. No. 7,962,719 which is a divisional of U.S. application Ser. No. 10/859,708 filed Jun. 3, 2004 issued as U.S. Pat. No. 7,424,594 which is a divisional of U.S. application Ser. No. 09/337,839 filed Jun. 22, 1999 issued as U.S. Pat. No. 6,839,728, which claims the benefit of U.S. Provisional Application Ser. No. 60/103,712 filed Oct. 9, 1998, which are incorporated by reference in their entirety herein.

FIELD OF THE INVENTION

The present invention relates generally to improvements to parallel processing, and more particularly to methods and apparatus for efficiently calculating the result of a complex multiplication. Further, the present invention relates to the use of this approach in a very efficient FFT implementation on the manifold array ("ManArray") processing architecture.

BACKGROUND OF THE INVENTION

The product of two complex numbers x and y is defined to be $z = x_R y_R - x_I y_I + i(x_R y_I + x_I y_R)$, where $x = x_R + ix_I$, $y = y_R + iy_I$ and i is an imaginary number, or the square root of negative one, with $i^2 = -1$. This complex multiplication of x and y is calculated in a variety of contexts, and it has been recognized that it will be highly advantageous to perform this calculation faster and more efficiently.

SUMMARY OF THE INVENTION

The present invention defines hardware instructions to calculate the product of two complex numbers encoded as a pair of two fixed-point numbers of 16 bits each in two cycles with single cycle pipeline throughput efficiency. The present invention also defines extending a series of multiply complex instructions with an accumulate operation. These special instructions are then used to calculate the FFT of a vector of numbers efficiently.

A more complete understanding of the present invention, as well as other features and advantages of the invention will be apparent from the following Detailed Description and the accompanying drawings.

BRIEF DESCRIPTION OF THE DRAWINGS

FIG. 2A illustrates a presently preferred multiply complex instruction, MPYCX;

FIG. 2B illustrates the syntax and operation of the MPYCX instruction of FIG. 2A;

FIG. 3A illustrates a presently preferred multiply complex divide by 2 instruction, MPYCXD2;

FIG. 3B illustrates the syntax and operation of the MPYCXD2 instruction of FIG. 3A;

FIG. 4A illustrates a presently preferred multiply complex conjugate instruction, MPYCXJ;

FIG. 4B illustrates the syntax and operation of the MPYCXJ instruction of FIG. 4A;

FIG. 5A illustrates a presently preferred multiply complex conjugate divide by two instruction, MPYCXJD2;

FIG. 5B illustrates the syntax and operation of the MPYCXJD2 instruction of FIG. 5A;

FIG. 9A-9H illustrate aspects of the implementation of a distributed FFT algorithm on a 2×2 ManArray processor using a VLIW algorithm with MPYCX instructions in a cycle-by-cycle sequence with each step corresponding to operations in the FFT signal flow graph;

FIG. 9I illustrates how multiple iterations may be tightly packed in accordance with the present invention for a distributed FFT of length four;

FIG. 9J illustrates how multiple iterations may be tightly packed in accordance with the present invention for a distributed FFT of length two;

FIGS. 10A and 10B illustrate Kronecker Product examples for use in reference to the mathematical presentation of the presently preferred distributed FFT algorithm;

FIG. 11A illustrates a presently preferred multiply accumulate instruction, MPYA;

FIG. 11B illustrates the syntax and operation of the MPYA instruction of FIG. 11A;

FIG. 12A illustrates a presently preferred sum of 2 products accumulate instruction, SUM2PA;

FIG. 12B illustrates the syntax and operation of the SUM2PA instruction of FIG. 12A;

FIG. 13A illustrates a presently preferred multiply complex accumulate instruction, MPYCXA;

FIG. 13B illustrates the syntax and operation of the MPYCXA instruction of FIG. 13A;

FIG. 14A illustrates a presently preferred multiply complex accumulate divide by two instruction, MPYCXAD2;

FIG. 14B illustrates the syntax and operation of the MPYCXAD2 instruction of FIG. 14A;

FIG. 15A illustrates a presently preferred multiply complex conjugate accumulate instruction, MPYCXJA;

FIG. 15B illustrates the syntax and operation of the MPYCXJA instruction of FIG. 15A;

FIG. 16A illustrates a presently preferred multiply complex conjugate accumulate divide by two instruction, MPYCXJAD2;

FIG. 16B illustrates the syntax and operation of the MPYCXJAD2 instruction of FIG. 16A;

DETAILED DESCRIPTION

Further details of a presently preferred ManArray architecture for use in conjunction with the present invention are found in U.S. patent application Ser. No. 08/885,310 filed Jun. 30, 1997, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999, U.S.

patent application Ser. No. 09/238,446 filed Jan. 28, 1999, U.S. patent application Ser. No. 09/267,570 filed Mar. 12, 1999, as well as, Provisional Application Ser. No. 60/092,130 entitled "Methods and Apparatus for Instruction Addressing in Indirect VLIW Processors" filed Jul. 9, 1998, Provisional Application Ser. No. 60/103,712 entitled "Efficient Complex Multiplication and Fast Fourier Transform (FFT) Implementation on the ManArray" filed Oct. 9, 1998, Provisional Application Ser. No. 60/106,867 entitled "Methods and Apparatus for Improved Motion Estimation for Video Encoding" filed Nov. 3, 1998, Provisional Application Ser. No. 60/113,637 entitled "Methods and Apparatus for Providing Direct Memory Access (DMA) Engine" filed Dec. 23, 1998 and Provisional Application Ser. No. 60/113,555 entitled "Methods and Apparatus Providing Transfer Control" filed Dec. 23, 1998, respectively, and incorporated by reference herein in their entirety.

Figure 1:
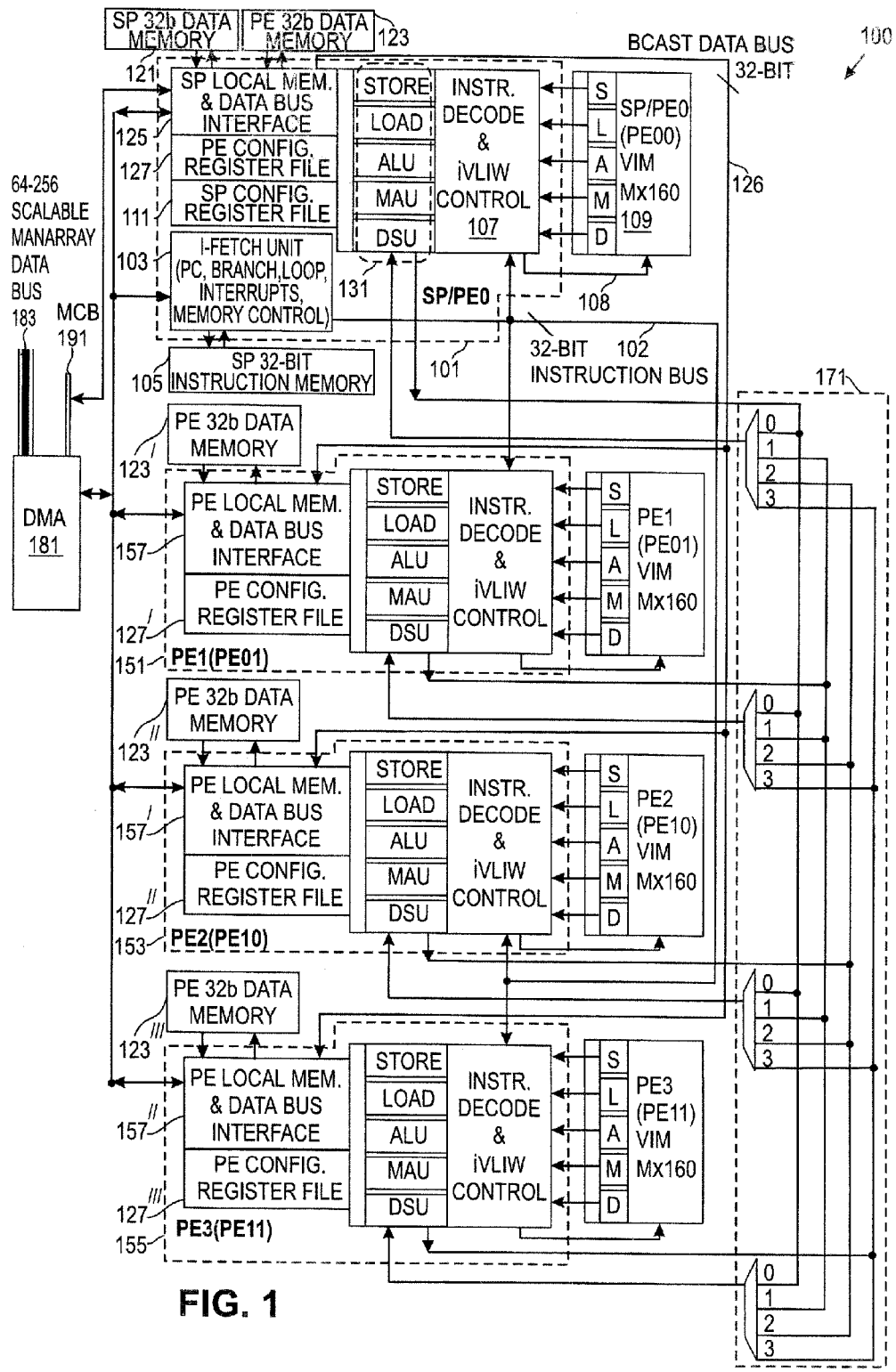
FIG. 1 illustrates an exemplary 2×2 ManArray iVLIW processor.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate the implementation of efficient complex multiplication and fast fourier transform (FFT) computations on the ManArray architecture in accordance with the present invention. It is noted that the PEs can be also labeled with their matrix positions as shown in parentheses for PE0 (PE00) 101, PE1 (PE01) 151, PE2 (PE10) 153, and PE3 (PE11) 155.

The SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, digital signal processing, EP loop operations, support for interrupts, and also provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. patent application Ser. No. 08/885,310 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

All of the above noted patents are assigned to the assignee of the present invention and incorporated herein by reference in their entirety.

Special Instructions for Complex Multiply

Turning now to specific details of the ManArray processor as adapted by the present invention, the present invention defines the following special hardware instructions that execute in each multiply accumulate unit (MAU), one of the execution units 131 of FIG. 1 and in each PE, to handle the multiplication of complex numbers:

MPYCX instruction 200 (FIG. 2A), for multiplication of complex numbers, where the complex product of two source operands is rounded according to the rounding mode specified in the instruction and loaded into the target register. The complex numbers are organized in the source register such that halfword H1 contains the real component and halfword H0 contains the imaginary component. The MPYCX instruction format is shown in FIG. 2A. The syntax and operation description 210 is shown in FIG. 2B.

MPYCXD2 instruction 300 (FIG. 3A), for multiplication of complex numbers, with the results divided by 2, FIG. 3, where the complex product of two source operands is divided by two, rounded according to the rounding mode specified in the instruction, and loaded into the target register. The complex numbers are organized in the source register such that halfword H1 contains the real component and halfword H0 contains the imaginary component. The MPYCXD2 instruction format is shown in FIG. 3A. The syntax and operation description 310 is shown in FIG. 3B.

MPYCXJ instruction 400 (FIG. 4A), for multiplication of complex numbers where the second argument is conjugated, where the complex product of the first source operand times the conjugate of the second source operand, is rounded according to the rounding mode specified in the instruction and loaded into the target register. The complex numbers are organized in the source register such that halfword H1 contains the real component and halfword H0 contains the imaginary component. The MPYCXJ instruction format is shown in FIG. 4A. The syntax and operation description 410 is shown in FIG. 4B.

MPYCXJD2 instruction 500 (FIG. 5A), for multiplication of complex numbers where the second argument is conjugated, with the results divided by 2, where the complex product of the first source operand times the conjugate of the second operand, is divided by two, rounded according to the rounding mode specified in the instruction and loaded into the target register. The complex numbers are organized in the source register such that halfword H1 contains the real component and halfword H0 contains the imaginary component. The MPYCXJD2 instruction format is shown in FIG. 5A. The syntax and operation description 510 is shown in FIG. 5B.

All of the above instructions 200, 300, 400 and 500 complete in 2 cycles and are pipeline-able. That is, another operation can start executing on the execution unit after the first cycle. All complex multiplication instructions return a word containing the real and imaginary part of the complex product in half words H1 and H0 respectively.

To preserve maximum accuracy, and provide flexibility to programmers, four possible rounding modes are defined:
  Round toward the nearest integer (referred to as ROUND)
  Round toward 0 (truncate or fix, referred to as TRUNC)
  Round toward infinity (round up or ceiling, the smallest integer greater than or equal to the argument, referred to as CEIL)
  Round toward negative infinity (round down or floor, the largest integer smaller than or equal to the argument, referred to as FLOOR).

Figure 6:
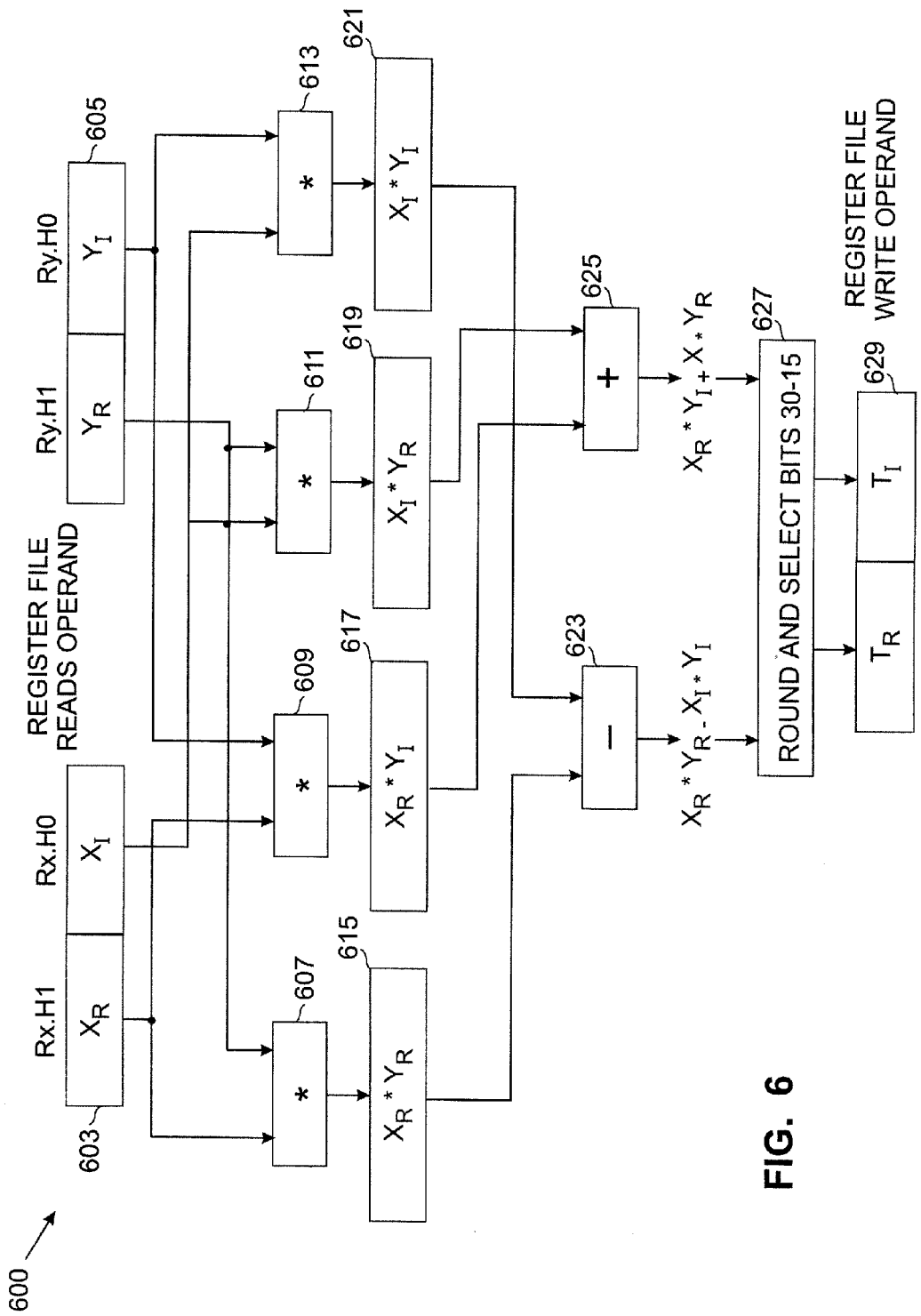
FIG. 6 illustrates hardware aspects of a pipelined multiply complex and its divide by two instruction variant.
Figure 7:
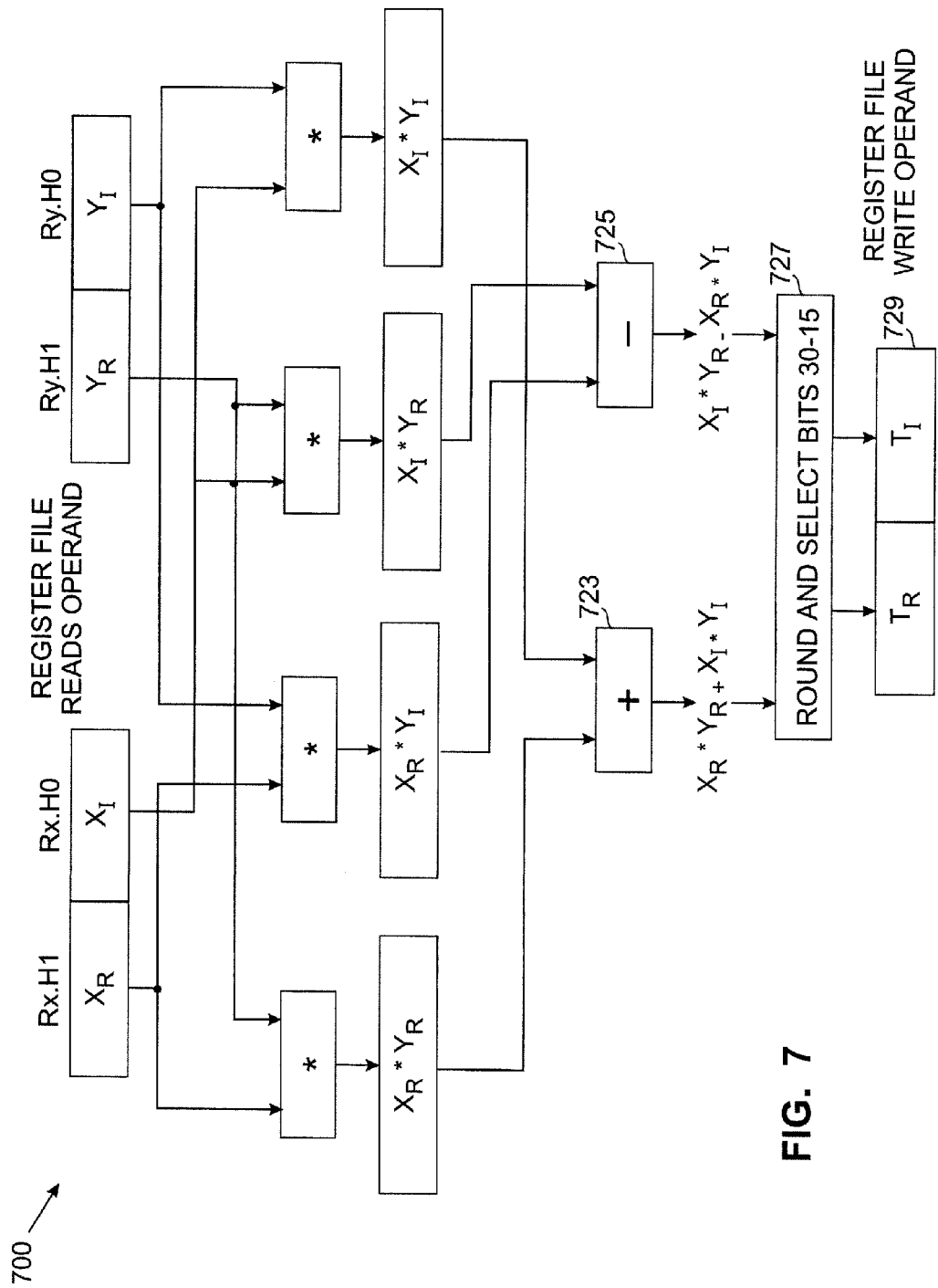
FIG. 7 illustrates hardware aspects of a pipelined multiply complex conjugate, and its divide by two instruction variant.

Hardware suitable for implementing the multiply complex instructions is shown in FIG. 6 and FIG. 7. These figures illustrate a high level view of the hardware apparatus 600 and 700 appropriate for implementing the functions of these instructions. This hardware capability may be advantageously embedded in the ManArray multiply accumulate unit (MAU), one of the execution units 131 of FIG. 1 and in each PE, along with other hardware capability supporting ft) other MAU instructions. As a pipelined operation, the first execute cycle begins with a read of the source register operands from the compute register file (CRF) shown as registers 603 and 605 in FIG. 6 and as registers 111, 127, 127', 127", and 127'" in FIG. 1. These register values are input to the MAU logic after some operand access delay in halfword data paths as indicated to the appropriate multiplication units 607, 609, 611, and 613 of FIG. 6. The outputs of the multiplication operation units, $X_R*Y_R$ 607, $X_R*Y_I$ 609, $X_I Y_R$ 611, and $X_I*Y_I$ 613, are stored in pipeline registers 615, 617, 619, and 621, respectively. The second execute cycle, which can occur while a new multiply complex instruction is using the first cycle execute facilities, begins with using the stored pipeline register values, in pipeline register 615, 617, 619, and 621, and appropriately adding in adder 625 and subtracting in subtractor 623 as shown in FIG. 6. The add function and subtract function are selectively controlled functions allowing either addition or subtraction operations as specified by the instruction. The values generated by the apparatus 600 shown in FIG. 6 contain a maximum precision of calculation which exceeds 16-bits. Consequently, the appropriate bits must be selected and rounded as indicated in the instruction before storing the final results. The selection of the bits and rounding occurs in selection and rounder circuit 627. The two 16-bit rounded results are then stored in the appropriate halfword position of the target register 629 which is located in the compute register file (CRF). The divide by two variant of the multiply complex instruction 300 selects a different set of bits as specified in the instruction through block 627. The hardware 627 shifts each data value right by an additional 1-bit and loads two divided-by-2 rounded and shifted values into each half word position in the target registers 629 in the CRF.

The hardware 700 for the multiply complex conjugate instruction 400 is shown in FIG. 7. The main difference between multiply complex and multiply complex conjugate is in adder 723 and subtractor 725 which swap the addition and subtraction operation as compared with FIG. 6. The results from adder 723 and subtractor 725 still need to be selected and rounded in selection and rounder circuit 727 and the final rounded results stored in the target register 729 in the CRF. The divide by two variant of the multiply complex conjugate instruction 500 selects a different set of bits as specified in the instruction through selection and rounder circuit 727. The hardware of circuit 727 shifts each data value right by an additional 1-bit and loads two divided-by-2 rounded and shifted values into each half word position in the target registers 729 in the CRF.

The FFT Algorithm

The power of indirect VLIW parallelism using the complex multiplication instructions is demonstrated with the following fast Fourier transform (FFT) example. The algorithm of this example is based upon the sparse factorization of a discrete Fourier transform (DFT) matrix. Kronecker-product mathematics is used to demonstrate how a scalable algorithm is created.

The Kronecker product provides a means to express parallelism using mathematical notation. It is known that there is a direct mapping between different tensor product forms and some important architectural features of processors. For example, tensor matrices can be created in parallel form and in vector form. J. Granata, M. Conner, R. Tolimieri, The Tensor Product: A Mathematical Programming Language for FFTs and other Fast DSP Operations, *IEEE SP Magazine*, January 1992, pp. 40-48. The Kronecker product of two matrices is a block matrix with blocks that are copies of the second argument multiplied by the corresponding element of the first argument. Details of an exemplary calculation of matrix vector products $$y=(I_m \otimes A)x$$

are shown in FIG. 10A. The matrix is block diagonal with m copies of A. If vector x was distributed block-wise in m processors, the operation can be done in parallel without any communication between the processors. On the other hand, the following calculation, shown in detail in FIG. 10B, $$y=(A \otimes I_m)x$$

requires that x be distributed physically on m processors for vector parallel computation.

The two Kronecker products are related via the identity $$I \otimes A = P(A \otimes I)P^T$$

where P is a special permutation matrix called stride permutation and $P^T$ is the transpose permutation matrix. The stride permutation defines the required data distribution for a parallel operation, or the communication pattern needed to transform block distribution to cyclic and vice-versa.

The mathematical description of parallelism and data distributions makes it possible to conceptualize parallel programs, and to manipulate them using linear algebra identities and thus better map them onto target parallel architectures. In addition, Kronecker product notation arises in many different areas of science and engineering. The Kronecker product simplifies the expression of many fast algorithms. For example, different FFT algorithms correspond to different sparse matrix factorizations of the Discrete Fourier Transform (DFT), whose factors involve Kronecker products. Charles F. Van Loan, *Computational Frameworks for the Fast Fourier Transform*, SIAM, 1992, pp 78-80.

The following equation shows a Kronecker product expression of the FFT algorithm, based on the Kronecker product factorization of the DFT matrix, $$F_n = (F_p \otimes I_m) D_{p,m} (I_n \otimes F_m) P_{n,p}$$

where:
n is the length of the transform
p is the number of PEs
m=n/p

The equation is operated on from right to left with the $P_{n,p}$ permutation operation occurring first. The permutation directly maps to a direct memory access (DMA) operation that specifies how the data is to be loaded in the PEs based upon the number of PEs p and length of the transform n.

$$F_n = (F_p \otimes I_M) D_{p,m} (I_p \otimes F_m) P_{n,p}$$

where $P_{n,p}$ corresponds to DMA loading data with stride p to local PE memories.

In the next stage of operation all the PEs execute a local FFT of length m=n/p with local data. No communications between PEs is required.

$$F_n = (F_p \otimes I_m) D_{p,(I_p} \otimes F_m) P_n.$$

where $(I_p \otimes F_m)$ specifies that all PEs execute a local FFT of length m sequentially, with local data.

In the next stage, all the PEs scale their local data by the twiddle factors and collectively execute m distributed FFTs of length p. This stage requires inter-PE communications.

$$F_n = (F_p \otimes I_m) D_{p,m} (I_p \otimes F_m) P_{n,p}$$

where $(F_p \otimes I_m) D_{p,m}$ specifies that all PEs scale their local data by the twiddle factors and collectively execute multiple FFTs of length p on distributed data. In this final stage of the FFT computation, a relatively large number m of small distributed FFTs of size p must be calculated efficiently. The challenge is to completely overlap the necessary communications with the relatively simple computational requirements of the FFT.

Figure 8:
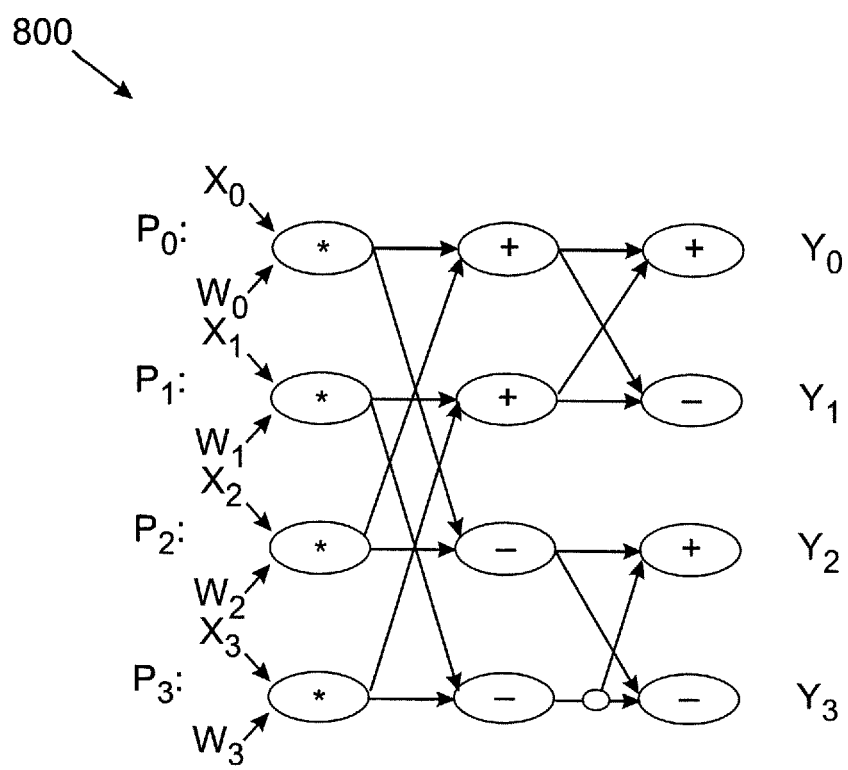
FIG. 8 shows an FFT signal flow graph.

The sequence of illustrations of FIGS. 9A-9H outlines the ManArray distributed FFT algorithm using the indirect VLIW architecture, the multiply complex instructions, and operating on the 2×2 ManArray processor 100 of FIG. 1. The signal flow graph for the small FFT is shown in FIG. 8 and also shown in the right-hand-side of FIGS. 9A-9H. In FIG. 8, the operation for a 4 point FFT is shown where each PE executes the operations shown on a horizontal row. The operations occur in parallel on each vertical time slice of operations as shown in the signal flow graph figures in FIGS. 9A-9H. The VLIW code is displayed in a tabular form in FIGS. 9A-9H that corresponds to the structure of the ManArray architecture and the iVLIW instruction. The columns of the table correspond to the execution units available in the ManArray PE: Load Unit, Arithmetic Logic Unit (ALU), Multiply Accumulate Unit (MAU), Data Select Unit (DSU) and the Store Unit. The rows of the table can be interpreted as time steps representing the execution of different iVLIW lines.

Figure 9A:
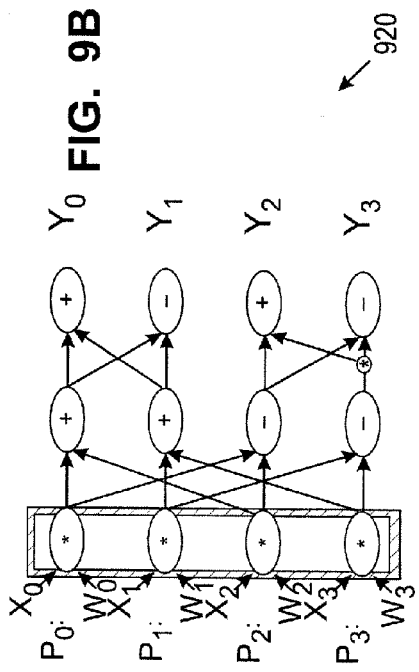
Figure 9B:
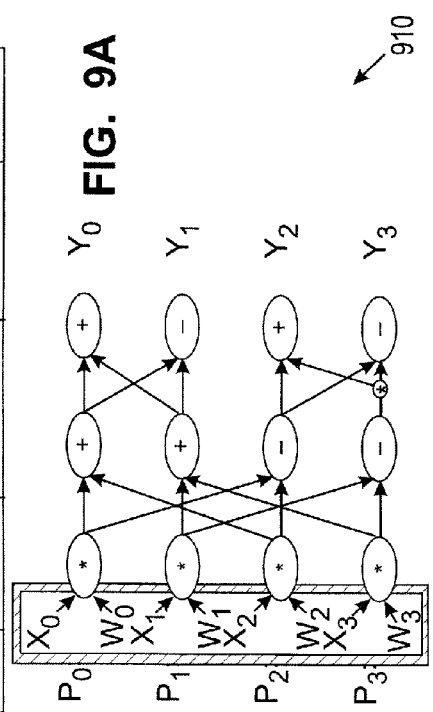
Figure 9F:
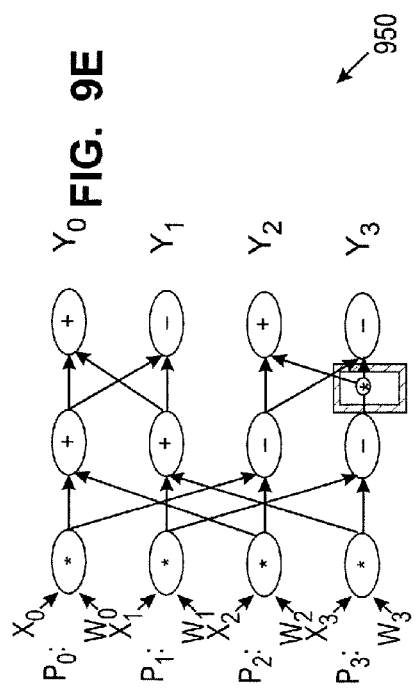
Figure 9E:
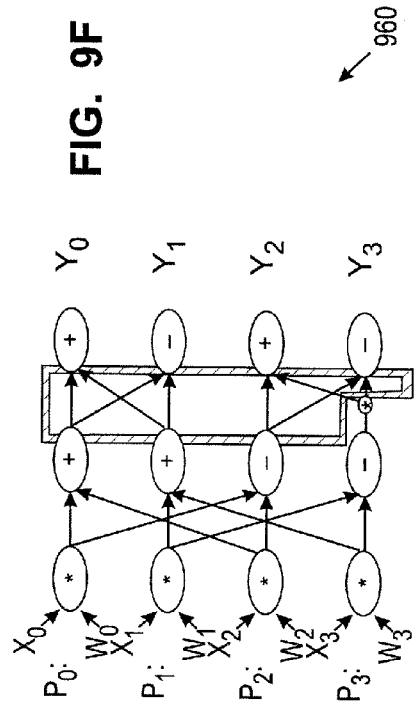
Figure 9G:
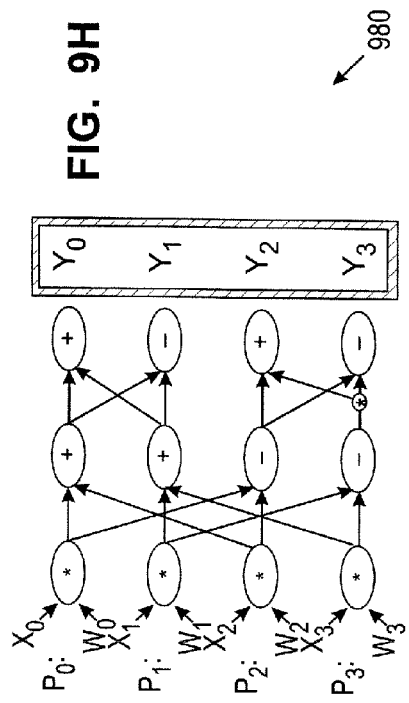
Figure 9H:
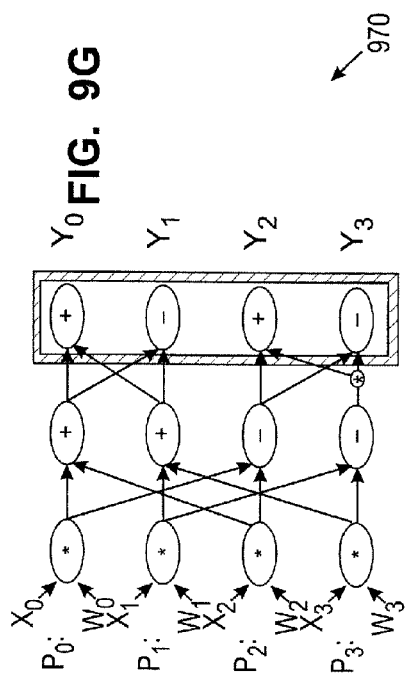

The technique shown is a software pipeline implemented approach with iVLIWs. In FIGS. 9A-9I, the tables show the basic pipeline for PE3 155. FIG. 9A represents the input of the data X and its corresponding twiddle factor W by loading them from the PEs local memories, using the load indirect (Lii) instruction. FIG. 9B illustrates the complex arguments X and W which are multiplied using the MPYCX instruction 200, and FIG. 9C illustrates the communications operation between PEs, using a processing element exchange (PEXCHG) instruction. Further details of this instruction are found in U.S. application Ser. No. 09/169,256 entitled "Methods and Apparatus for ManArray PE-PE Switch Control" filed Oct. 9, 1998. FIG. 9D illustrates the local and received quantities are added or subtracted (depending upon the processing element, where for PE3 a subtract (sub) instruction is used). FIG. 9E illlustrates the result being multiplied by −i on PE3, using the MPYCX instruction. FIG. 9F illustrates another PE-to-PE communications operation where the previous product is exchanged between the PEs, using the PEXCHG instruction. FIG. 9G illustrates the local and received quantities are added or subtracted (depending upon the processing element, where for PE3 a is subtract (sub) instruction is used). FIG. 9H illustrates the step where the results are stored to local memory, using a store indirect (sii) instruction.

The code for PEs 0, 1, and 2 is very similar, the two subtractions in the arithmetic logic unit in steps 9D and 9G are substituted by additions or subtractions in the other PEs as required by the algorithm displayed in the signal flow graphs. To achieve that capability and the distinct MPYCX operation in FIG. 9E shown in these figures, synchronous MIMD capability is required as described in greater detail in U.S. patent application Ser. No. 09/187,539 filed Nov. 6, 1998 and incorporated by reference herein in its entirety. By appropriate packing, a very tight software pipeline can be achieved as shown in FIG. 9I for this FFT example using only two VLIWs.

In the steady state, as can be seen in FIG. 9I, the Load, ALU, MAU, and DSU units are fully utilized in the two VLIWs while the store unit is used half of the time. This high utilization rate using two VLIWs leads to very high performance. For example, a 256-point complex FFT can be accomplished in 425 cycles on a 2×2 ManArray.

As can be seen in the above example, this implementation accomplishes the following:
  An FFT butterfly of length 4 can be calculated and stored every two cycles, using four PEs.
  The communication requirement of the FFT is completely overlapped by the computational requirements of this algorithm.
  The communication is along the hypercube connections that are available as a subset of the connections available in the ManArray interconnection network.
  The steady state of this algorithm consists of only two VLIW lines (the source code is two VLIW lines long).
  All execution units except the Store unit are utilized all the time, which lead us to conclude that this implementation is optimal for this architecture.

Problem Size Discussion
  The equation:

$$F_n = (F_p \otimes I_m) D_{p,m} (I_p \otimes F_m) P_{n,p}$$

where:
n is the length of the transform,
p is the number of PEs, and
m=n/p is parameterized by the length of the transform n and the number of PEs, where m=n/p relates to the size of local memory needed by the PEs. For a given power-of-2 number of processing elements and a sufficient amount of available local PE memory, distributed FFTs of size p can be calculated on a ManArray processor since only hypercube connections are required. The hypercube of p or fewer nodes is a proper subset of the ManArray network. When p is a multiple of the number of processing elements, each PE emulates the operation of more than one virtual node. Therefore, any size of FFT problem can be handled using the above equation on any size to of ManArray processor.

For direct execution, in other words, no emulation of virtual PEs, on a ManArray of size p, we need to provide a distributed FFT algorithm of equal size. For p=1, it is the sequential FFT. For p=2, the FFT of length 2 is the butterfly:

$$Y0=x0+w*X1, \text{ and}$$

$$Y1=x0-w*X1$$

where X0 and Y0 reside in or must be saved in the local memory of PE0 and X1 and Y1 on PE1, respectively. The VLIWs in PE0 and PE1 in a 1×2 ManArray processor (p=2) that are required for the calculation of multiple FFTs of length 2 are shown in FIG. 9J which shows that two FFT results are produced every two cycles using four VLIWs.

Extending Complex Multiplication

It is noted that in the two-cycle complex multiplication hardware described in FIGS. 6 and 7, the addition and subtraction blocks 623, 625, 723, and 725 operate in the second execution cycle. By including the MPYCX, MPYCXD2, MPYCXJ, and MPYCXJD2 instructions in the ManArray MAU, one of the execution units 131 of FIG. 1, the complex multiplication operations can be extended. The ManArray MAU also supports multiply accumulate operations (MACs) as shown in FIGS. 11A and 12A for use in general digital signal processing (DSP) applications. A multiply accumulate instruction (MPYA) 1100 as shown in FIG. 11A, and a sum two product accumulate instruction (SUM2PA) 1200 as shown in FIG. 12A, are defined as follows.

In the MPYA instruction 1100 of FIG. 11A, the product of source registers Rx and Ry is added to target register Rt. The word multiply form of this instruction multiplies two 32-bit values producing a 64-bit result which is added to a 64-bit odd/even target register. The dual halfword form of MPYA instruction 1100 multiplies two pairs of 16-bit values producing two 32-bit results: one is added to the odd 32-bit word, the other is added to the even 32-bit word of the odd/even target register pair. Syntax and operation details 1110 are shown in FIG. 11B. In the SUM2PA instruction 1200 of FIG. 12A, the product of the high halfwords of source registers Rx and Ry is added to the product of the low halfwords of Rx and Ry and the result is added to target register Rt and then stored in Rt. Syntax and operation details 1210 are shown in FIG. 12B.

Both MPYA and SUMP2A generate the accumulate result in the second cycle of the two-cycle pipeline operation. By merging MPYCX, MPYCXD2, MPYCXJ, and MPYCXJD2 instructions with MPYA and SUMP2A instructions, the hardware supports the extension of the complex multiply operations with an accumulate operation. The mathematical operation is defined as: $Z_T=Z_R+X_RY_R-X_IY_I+i(Z_I+X_RY_I+X_IY_R)$, where $X=X_R+iX_I, Y=Y_R+iY_I$ and i is an imaginary number, or the square root of negative one, with $i^2=-1$. This complex multiply accumulate is calculated in a variety of contexts, and it has been recognized that it will be highly advantageous to perform this calculation faster and more efficiently.

For this purpose, an MPYCXA instruction 1300 (FIG. 13A), an MPYCXAD2 instruction 1400 (FIG. 14A), an MPYCXJA instruction 1500 (FIG. 15A), and an MPYCXJAD2 instruction 1600 (FIG. 16A) define the special hardware instructions that handle the multiplication with accumulate for complex numbers. The MPYCXA instruction 1300, for multiplication of complex numbers with accumulate is shown in FIG. 13. Utilizing this instruction, the accumulated complex product of two source operands is rounded according to the rounding mode specified in the instruction and loaded into the target register. The complex numbers are organized in the source register such that halfword H1 contains the real component and halfword H0 contains the imaginary component. The MPYCXA instruction format is shown in FIG. 13A. The syntax and operation description 1310 is shown in FIG. 13B.

The MPYCXAD2 instruction 1400, for multiplication of complex numbers with accumulate, with the results divided by two is shown in FIG. 14A. Utilizing this instruction, the accumulated complex product of two source operands is divided by two, rounded according to the rounding mode specified in the instruction, and loaded into the target register. The complex numbers are organized in the source register such that halfword H1 contains the real component and halfword H0 contains the imaginary component. The MPYCXAD2 instruction format is shown in FIG. 14A. The syntax and operation description 1410 is shown in FIG. 14B.

The MPYCXJA instruction 1500, for multiplication of complex numbers with accumulate where the second argument is conjugated is shown in FIG. 15A. Utilizing this instruction, the accumulated complex product of the first source operand times the conjugate of the second source operand, is rounded according to the rounding mode specified in the instruction and loaded into the target register. The complex numbers are organized in the source register such that halfword H1 contains the real component and halfword H0 contains the imaginary component. The MPYCXJA instruction foimat is shown in FIG. 15A. The syntax and operation description 1510 is shown in FIG. 15B.

The MPYCXJAD2 instruction 1600, for multiplication of complex numbers with accumulate where the second argument is conjugated, with the results divided by two is shown in FIG. 16A. Utilizing this instruction, the accumulated complex product of the first source operand times the conjugate of the second operand, is divided by two, rounded according to the rounding mode specified in the instruction and loaded into the target register. The complex numbers are organized in the source register such that halfword H1 contains the real component and halfword H0 contains the imaginary component. The MPYCXJAD2 instruction format is shown in FIG. 16A. The syntax and operation description 1610 is shown in FIG. 16B.

All instructions of the above instructions 1100, 1200, 1300, 1400, 1500 and 1600 complete in two cycles and are pipelineable. That is, another operation can start executing on the execution unit after the first cycle. All complex multiplication instructions 1300, 1400, 1500 and 1600 return a word containing the real and imaginary part of the complex product in half words H1 and H0 respectively.

To preserve maximum accuracy, and provide flexibility to programmers, the same four rounding modes specified previously for MPYCX, MPYCXD2, MPYCXJ, and MPYCXJD2 are used in the extended complex multiplication with accumulate.

Figure 17:
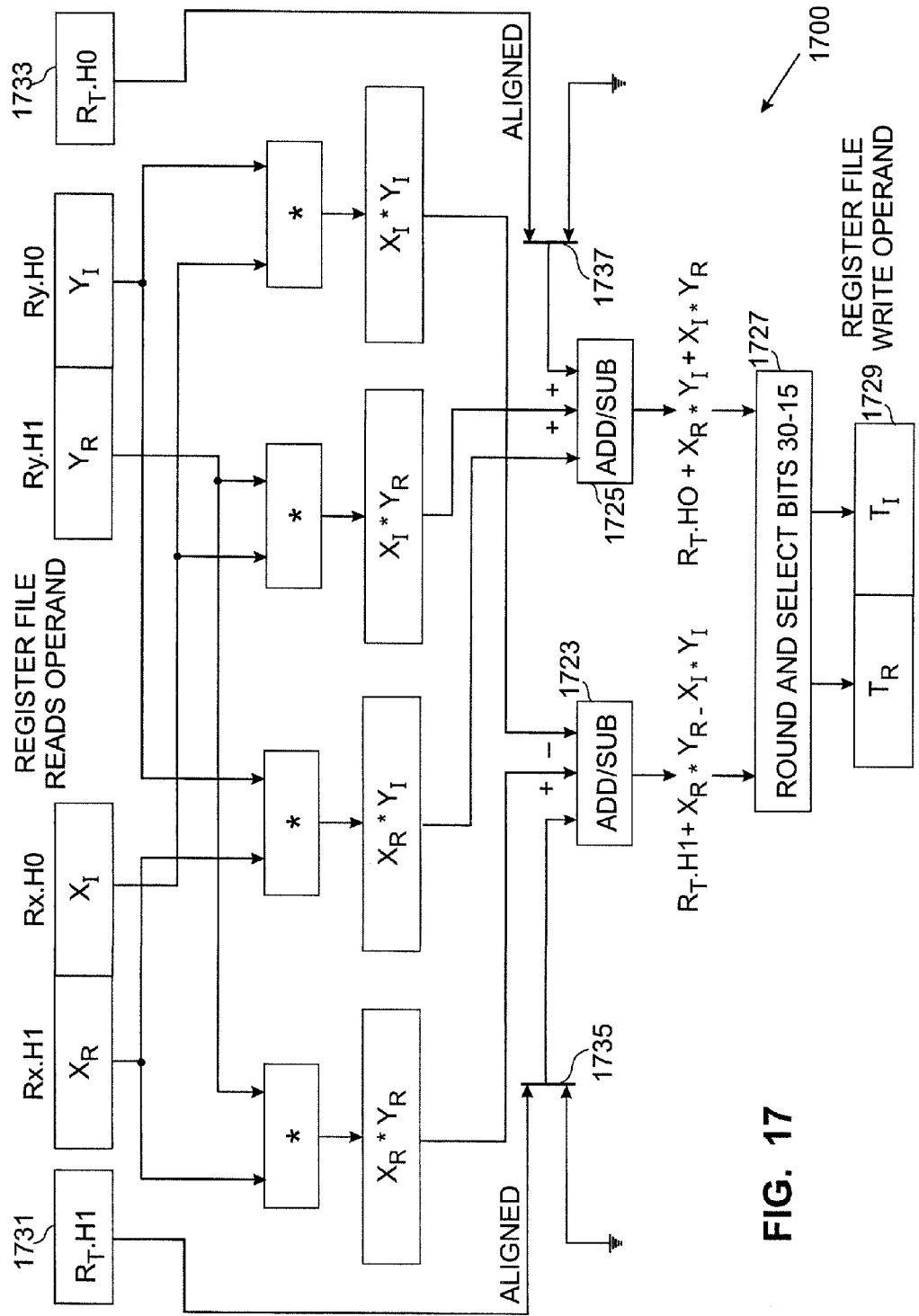
FIG. 17 illustrates hardware aspects of a pipelined multiply complex accumulate and its divide by two variant.
Figure 18:
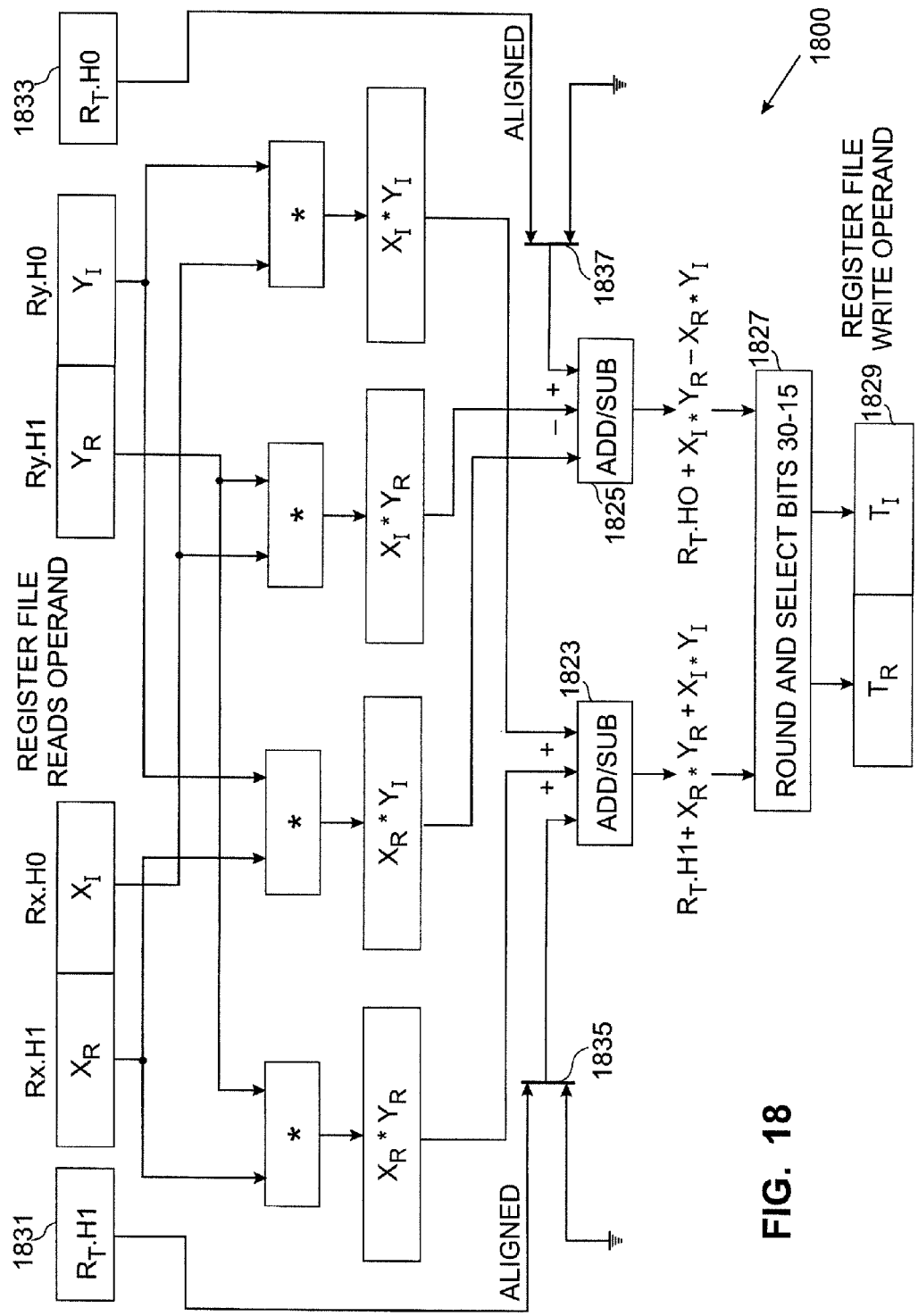
FIG. 18 illustrates hardware aspects of a pipelined multiply complex conjugate accumulate and its divide by two variant.

Hardware 1700 and 1800 for implementing the multiply complex with accumulate instructions is shown in FIG. 17 and FIG. 18, respectively. These figures illustrate the high level view of the hardware 1700 and 1800 appropriate for these instructions. The important changes to note between FIG. 17 and FIG. 6 and between FIG. 18 and FIG. 7 are in the second stage of the pipeline where the two-input adder blocks 623, 625, 723, and 725 are replaced with three-input adder blocks 1723, 1725, 1823, and 1825. Further, two new half word source operands are used as inputs to the operation. The Rt.H1 1731 (1831) and Rt.H0 1733 (1833) values are properly aligned and selected by multiplexers 1735 (1835) and 1737 (1837) as inputs to the new adders 1723 (1823) and 1725 (1825). For the appropriate alignment, Rt.H1 is shifted right by 1-bit and Rt.H0 is shifted left by 15-bits. The add/subtract, add/sub blocks 1723 (1823) and 1725 (1825), operate on the input data and generate the outputs as shown. The add function and subtract function are selectively controlled functions allowing either addition or subtraction operations as specified by the instruction. The results are rounded and bits 30-15 of both 32-bit results are selected 1727 (1827) and stored in the appropriate half word of the target register 1729 (1829) in the CRF. It is noted that the multiplexers 1735 (1835) and 1737 (1837) select the zero input, indicated by the ground symbol, for the non-accumulate versions of the complex multiplication series of instructions.

While the present invention has been disclosed in the context of various aspects of presently preferred embodiments, it will be recognized that the invention may be suitably applied to other environments consistent with the claims which follow.

We claim:

1. A method for calculating a distributed Fast Fourier Transform (FFT) on an array of processing elements (PEs), the method comprising:
    loading complex numbers and twiddle factor values in each PE;
    executing multiply complex instructions in each PE to multiply a loaded complex number with an associated and loaded twiddle factor value to produce complex results in each PE; and
    communicating the complex results via an interconnection network over connection paths between the PEs, wherein the communication of the complex results is overlapped with operations in each PE on local values and previously communicated results in each PE to generate an FFT result distributed on the array of PEs.

2. The method of claim 1, wherein the communicating the complex results between the PEs overlapped with operations in each PE comprises:
    executing a first PE exchange instruction to communicate a first complex result along a first hypercube connection path between PEs of the array of PEs;
    generating a second complex result from a first operation on a local PE first complex result and a received first complex result, wherein the first operation is based on a position of a PE in the array of PEs;
    executing a second PE exchange instruction to communicate the second complex result along a second hypercube connection path between PEs of the array of PEs; and
    generating the FFT result from a second operation on a local PE second complex result and a received second complex result, wherein the second operation is based on a position of a PE in the array of PEs.

3. The method of claim 1, wherein the complex results are rounded according to a rounding mode specified in the multiply complex instructions.

4. The method of claim 1, wherein the distributed FFT is calculated in a software pipeline using very long instruction words (VLIWs) selected to execute in parallel in each PE.

5. The method of claim 4, wherein during steady state, a VLIW is repeatedly selected for execution, wherein the selected VLIW is operable to execute based on a position of a PE in the array of PEs, and wherein the selected VLIW comprises a load instruction, a multiply complex instruction, a PE exchange communication instruction, an arithmetic logic unit (ALU) instruction, and a store instruction.

6. The method of claim 1, wherein the complex results are communicated along hypercube connection paths between PEs in the array of PEs.

7. The method of claim 1, wherein the complex results are communicated along hypercube connection paths that are a subset of connection paths available in an interconnection network that interconnects the PEs in the array of PEs.

8. An apparatus for calculating a distributed Fast Fourier Transform (FFT) on an array of processing elements (PEs), the apparatus comprising:
    a plurality of data memories, each data memory storing complex numbers and twiddle factor values;
    a plurality of PEs, each PE associated with a data memory from the plurality of data memories, and each PE configured to load a complex number and associated twiddle factor value as a second complex number to each PE from the associated data memory and each PE having an associated multiply complex execution unit configured for multiplying the loaded complex number with the loaded associated twiddle factor value to produce a complex result in each PE; and
    an interconnection network having hypercube connection paths between PEs and each PE selecting a hypercube connection path to communicate the complex result between PEs, wherein the communication of the complex result is overlapped with operations in each PE and each PE generates an FFT result distributed on the plurality of PEs.

9. The apparatus of claim 8, wherein each PE comprises:
    a register file where the complex result produced by the associated multiply complex execution unit is stored.

10. The apparatus of claim 9, wherein each complex result is accessed from the register file in each PE to communicate the complex result over the selected hypercube connection path to a destination PE.

11. The apparatus of claim 8, wherein each PE of a selected set of PEs accesses a complex result from a register file, selects the hypercube connection path, communicates the complex result to a destination PE, and stores the complex result in a register file in the destination PE in response to execution of a PEs exchange communication instruction in each PE of the selected set of PEs.

12. The apparatus of claim 8, wherein each associated multiply complex execution unit is responsive to a multiply complex instruction and each associated multiply complex execution units comprises:
    a set of four multiply units to generate a first two terms and a second two terms in response to a complex multiplication of the first complex number with the second complex number accessed from a register file local to each PE;
    an add unit which adds the first two terms to produce an imaginary component of a complex multiplication result;
    a subtract unit which subtracts the second two terms to produce a real component of the complex multiplication result; and
    a rounding unit to format the real component and the imaginary component as the complex result.

13. The apparatus of claim 8, wherein each associated multiply complex execution unit is responsive to a multiply complex conjugate instruction and each associated multiply complex execution units comprises:

a set of four multiply units to generate a first two terms and a second two terms in response to a complex conjugate multiplication of the first complex number with a conjugate of the second complex number accessed from a register file local to each PE;

an add unit which adds the second two terms to produce a real component of a complex multiplication result;

a subtract unit which subtracts the first two terms to produce an imaginary component of the complex multiplication result; and a rounding unit to format the real component and the imaginary component as the complex result.

14. A method for calculating a distributed Fast Fourier Transform (FFT) on an array of processing elements (PEs), the method comprising:

fetching a first complex number and a second complex number in each PE;

executing multiply complex instructions in each PE to multiply the first complex number with the second complex number to produce complex results in each PE; and communicating the complex results between the PEs over hypercube connection paths overlapped with operations on local values and previously communicated results in each PE to generate an FFT result distributed on the array of PEs.

15. The method of claim 14, wherein the first complex number and the second complex number are fetched from a register file local in each PE.

16. The method of claim 14, wherein the first complex number and the second complex number are fetched from a data memory of a plurality of data memories for storage in a register file local in each PE, wherein each data memory of the plurality of data memories is associated with one PE of the array of PEs.

17. The method of claim 14, wherein communicating the complex results between each PE comprises:

executing a first PE exchange instruction in a first PE to communicate a first complex result along a first hypercube connection path between the first PE and a second PE of the array of PEs; and executing a second PE exchange instruction in the second PE in parallel with executing the first PE exchange instruction to communicate the second complex result along a second hypercube connection path between the first PE and the second PE of the array of PEs.

18. The method of claim 14, wherein the distributed FFT is calculated in a software pipeline using very long instruction words (VLIWs), the VLIWs distributed to a VLIW memory located in each PE from which VLIWs are selectively fetched to execute in each PE in parallel in the array of PEs.

19. The method of claim 18, wherein during steady state operation of the software pipeline, a VLIW is repeatedly selected in each PE for execution, wherein the selected VLIW comprises a load instruction, an arithmetic logic unit (ALU) instruction, a multiply accumulate unit (MAU) multiply complex instruction, a data select unit (DSU) PE exchange instruction, and a store instruction.

20. The method of claim 14, wherein the multiplication of the first complex number with the second complex number produces a real result and an imaginary result in each PE, the real result and the imaginary result are both separately rounded to a format for the complex results having the same format as the first complex number, wherein the format of the first complex number is the same format as the second complex number.

* * * * *